(12) United States Patent
Andersson

(10) Patent No.: US 9,349,248 B2
(45) Date of Patent: May 24, 2016

(54) LICENSE MANAGEMENT IN A GAMING SYSTEM

(75) Inventor: Håkan Andersson, Sundbyberg (SE)

(73) Assignee: VIDEO B HOLDINGS LIMITED, Tortola (VG)

(*) Notice: Subject to any disclaimer, the term of this patent is extended or adjusted under 35 U.S.C. 154(b) by 865 days.

(21) Appl. No.: 11/757,944

(22) Filed: Jun. 4, 2007

(65) Prior Publication Data
US 2008/0064493 A1 Mar. 13, 2008

(30) Foreign Application Priority Data
Jun. 2, 2006 (SE) .................................. 0601238-9

(51) Int. Cl.
G06F 17/00 (2006.01)
G06F 19/00 (2011.01)
G07F 17/32 (2006.01)
G06F 21/10 (2013.01)

(52) U.S. Cl.
CPC ............ *G07F 17/3241* (2013.01); *G06F 21/10* (2013.01); *G07F 17/32* (2013.01); *G07F 17/3227* (2013.01); *G07F 17/3269* (2013.01); *A63F 2300/401* (2013.01)

(58) Field of Classification Search
CPC ... G07F 17/32; G07F 17/323; G07F 17/3225; G07F 17/3262; G07F 17/3269; G07F 17/34

USPC ........................................................ 463/29, 42
See application file for complete search history.

(56) References Cited

U.S. PATENT DOCUMENTS

| | | | | |
|---|---|---|---|---|
| 5,204,897 A | * | 4/1993 | Wyman | 710/200 |
| 5,697,843 A | * | 12/1997 | Manship et al. | 463/20 |
| 2002/0071557 A1 | * | 6/2002 | Nguyen | 380/251 |
| 2004/0259640 A1 | | 12/2004 | Gentles et al. | |
| 2005/0192099 A1 | * | 9/2005 | Nguyen et al. | 463/42 |
| 2005/0282637 A1 | * | 12/2005 | Gatto et al. | 463/42 |
| 2006/0111168 A1 | * | 5/2006 | Nguyen et al. | 463/16 |
| 2006/0160625 A1 | * | 7/2006 | Englman et al. | 463/42 |
| 2010/0062835 A1 | * | 3/2010 | Hopkins | 463/25 |

FOREIGN PATENT DOCUMENTS

WO  WO 03/085613  10/2003

* cited by examiner

*Primary Examiner* — Lawrence Galka
(74) *Attorney, Agent, or Firm* — Cantor Colbrun LLP

(57) ABSTRACT

There is disclosed a gaming system comprising, a gaming machine terminal configured to seek to initiate a game session, a license management client configured to control initiation of the game session based on a license control parameter, and a license management server in data communication with the license management client and configured to generate the license control parameter and serve the license control parameter to the license management client.

18 Claims, 6 Drawing Sheets

LICENSE MANAGEMENT IN A GAMING SYSTEM

CROSS REFERENCE TO RELATED APPLICATIONS

This application is a continuation of Swedish Patent Application No. 0601238-9, having an international filing date of Jun. 2, 2006, entitled "License Management in a Gaming system", which is hereby incorporated by reference herein in its entirety.

TECHNICAL FIELD

The present invention relates generally to the management of licensed rights in a computerized gaming system.

BACKGROUND

Computerized gaming systems are usually managed by game operators that are authorized to run a certain limited number of gaming machines according to a license granted by supervising authorities. Other kinds of licenses such as rights to use digital software or data also occur in gaming systems. Traditionally, licenses are managed with manually and there is a need for better efficiency in this respect.

SUMMARY OF THE INVENTION

In a first aspect there is provided a gaming system comprising:
  a gaming machine terminal configured to seek to initiate a game session;
  a license management client (LMC) configured to control initiation of the game session based on a license control parameter (LCP); and
  a license management server (LMS) in data communication with the LMC and configured to generate the LCP and serve the LCP to the LMC.
  In an embodiment the LMS is arranged to generate the LCP based on at least one license parameter.
  In an embodiment the LMS is arranged to generate the LCP based on at least one license control rule.
  In an embodiment the gaming system further comprises a license parameter database configured for storing license parameters.
  In an embodiment the license parameter database is configured to store license control rules.
  In an embodiment the gaming system further comprises a license configuration interface configured to allow a user to define and enter at least one of a license parameter and a license control rule into the license parameter database.
  In an embodiment the license management client is provided in a game server.
  In an embodiment the license management client is provided in the gaming machine terminal.
  In an embodiment the license parameter database is provided in a back office database accessible by the license management server.
  In an embodiment the LMS is configured to update the license parameters in the license parameter database based on the generated license control parameter.
  In an embodiment the LMS generates a plurality of license control parameters.
  In an embodiment the LCP encodes plural license conditions.
  In an embodiment the LMC controls initiation of the gaming session by enabling the game session.
  In an embodiment the LMC controls initiation of the gaming session by disabling the game session
  In an embodiment the LMC controls initiation of the gaming session by modifying a set of available game options available in respect of the game session.
  In an embodiment the LMC controls initiation of the gaming session by suggesting to the player an alternate game session.
  In a second aspect, the invention provides a method for managing licensed rights in a computerized gaming system
    generating a license control parameter (LCP) in response to an attempt to initiate a game session; and
    controlling initiation of the game session based on the LCP.
  In an embodiment the method further comprises generating the LCP based on at least one license parameter.
  In an embodiment the method further comprises generating the LCP based on at least one control rule.
  In an embodiment the method further comprises the step of updating a license parameter dependent on the generated LCP.
  In an embodiment said license parameter is defined for a predetermined category of gaming machine operations.
  In an embodiment said predetermined category is dependent on the number of active gaming machines.
  In an embodiment said predetermined category is dependent on the number of started games.
  In an embodiment said predetermined category is dependent on the number of started games of a specific kind.
  In an embodiment the lifespan of an enabling license control parameter is controlled dependent on predetermined rules.
  In an embodiment said predetermined lifespan rules is based on the gaming machine login time.
  In a third aspect the invention provides a computer program code which when executed causes a computer to carry out the above method.
  In a fourth aspect the invention provides a computer readable medium having thereon the computer program code.
  In a fifth aspect the invention provides a license management client (LMC) for a gaming system, the LMC arranged to:
    determine that a gaming machine is seeking to initiate a gaming session;
    send a license control parameter (LCP) request to a license management server (LMS);
    receive a LCP from the LMS; and
    control initiation of the gaming system based on the LCP.
  In a sixth aspect the invention provides a license management server (LMS) for a gaming system; the LMS arranged to:
    receive a license control parameter (LCP) request from a license management client (LMS);
    generate an LCP based on the LCP request;
    the LCP allowing the LMC to control initiation of the gaming system; and
    send the LCP to the LMC.
  Other aspects and advantages of the invention are described in the below description text. Certain embodiments of the invention may be realized as a method, a system and a computer program product.

BRIEF DESCRIPTION OF ACCOMPANYING DRAWINGS

The invention is further explained by means of the following non-limiting examples and in conjunction with the accompanying drawings, in which.

DETAILED DESCRIPTION OF EMBODIMENTS OF THE INVENTION

In the preferred embodiment the described method steps and functions are realized computer system components, computer software code portions, or by means of combinations thereof. It is within the knowledge of the skilled person to select appropriate components for the realization of embodiments of the invention.

Figure 1A:
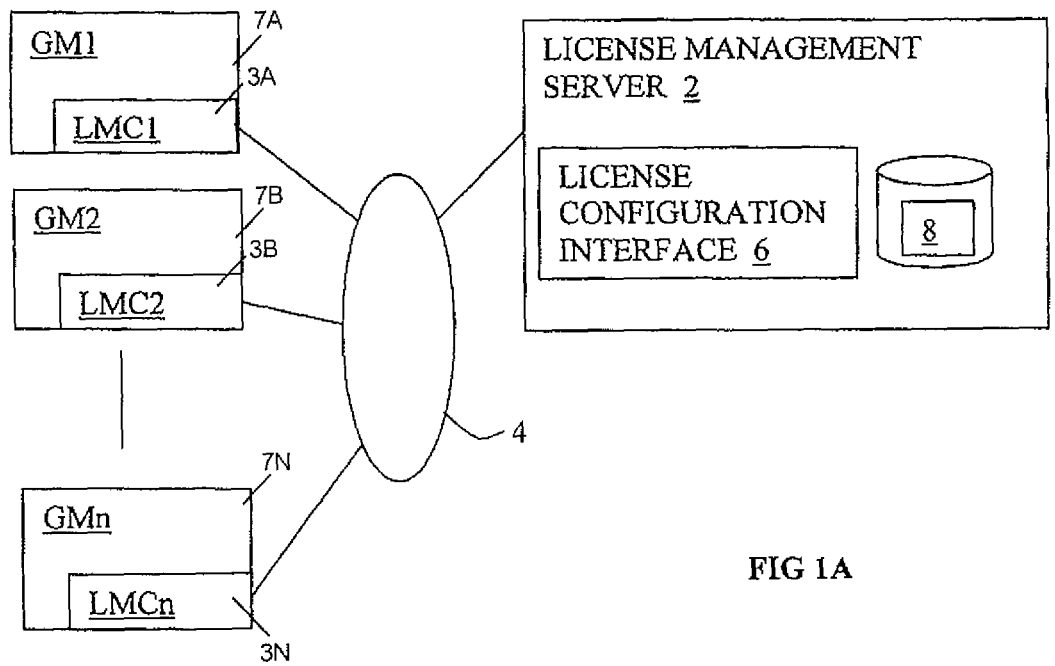
FIG. 1A shows schematically a computerized gaming system with a plurality of gaming machines and a license management system in accordance with an embodiment of the invention.

FIG. 1A shows schematically a general gaming system 1 with a plurality of computerized gaming machines GM1, GM2 . . . GMn 7 of a per se known kind equipped with a human-machine interface having a display screen, input means and game software, where the number n is arbitrary. Each of the gaming machines has a license management client LMC1, LMC2 . . . LMCn 3 that is enabled to communicate with a license management server 2 via a communications network 4. The license management clients 3 are configured to control the operations of the respective gaming machines 7 dependent on license control parameters communicated from the license management server 2. The license management server 2 has or is communicatively coupled to a license configuration interface 6 and similarly comprises or is communicatively coupled to a data storage means, e.g. a database D8, configured for storing predetermined license parameters and/or predetermined license dependent control rules in a license parameter database. In this embodiment, the gaming machine seeks to establish a gaming session by executing game code already resident on the gaming machine and the license management client mediates or controls the establishment of this session.

According to certain embodiments of the invention, license parameters are defined dependent on the rights conferred by a granted license, e.g. the rights to have a certain maximum number of gaming machines concurrently active for gaming. The license parameters and/or the license dependent control rules are defined and entered into the license management system by means of the license configuration interface and are stored in the license parameter database.

In operation, the execution of gaming software is controlled by means of a license management client such that when the gaming terminal seeks to initiate a gaming session employing a software module, the license management client sends a request to the license management server for a license control parameter. The license management server, in response to the request, generates a license control parameter dependent on the license parameters and/or the license dependent control rules retrieved from the license parameter database. In the example where the license confers the rights to have a certain maximum number of gaming machines active for gaming, the license parameter database has a parameter describing current license utilization statistics in the form of a count value for currently active gaming machines and the maximum number of active gaming machines. The management server determines from predetermined rules, in this example by comparing a current count value to a maximum count value whether another gaming machine would be allowed to be enabled for operation. If the current count value is less than the maximum count value the license management server increments the current count value by 1 and thereby occupies one item of the licensed number of concurrently active gaming machines. The license server generates a license control parameter that has an enabling value and returns it in a response to the license management client, which in its turn enables continued operation of the initiated unit of gaming machine software. If not, e.g., if the maximum allowable number of gaming machines are concurrently active, the license management server generates a license control parameter that has a disabling value and returns it in a response to the license management client, which in turn disables continued operation of gaming session and, optionally initiates a presentation of some message to the player on the gaming machine screen.

In other embodiments, the gaming client may request and receive a plurality of license control parameters, e.g. a first license control parameter that indicates whether a gaming terminal can be used to play a gaming session at all and a second control parameter that indicates whether a specific game subject of the license request can be played (or a single license control parameter contain information about more than one license condition).

Figure 1B:
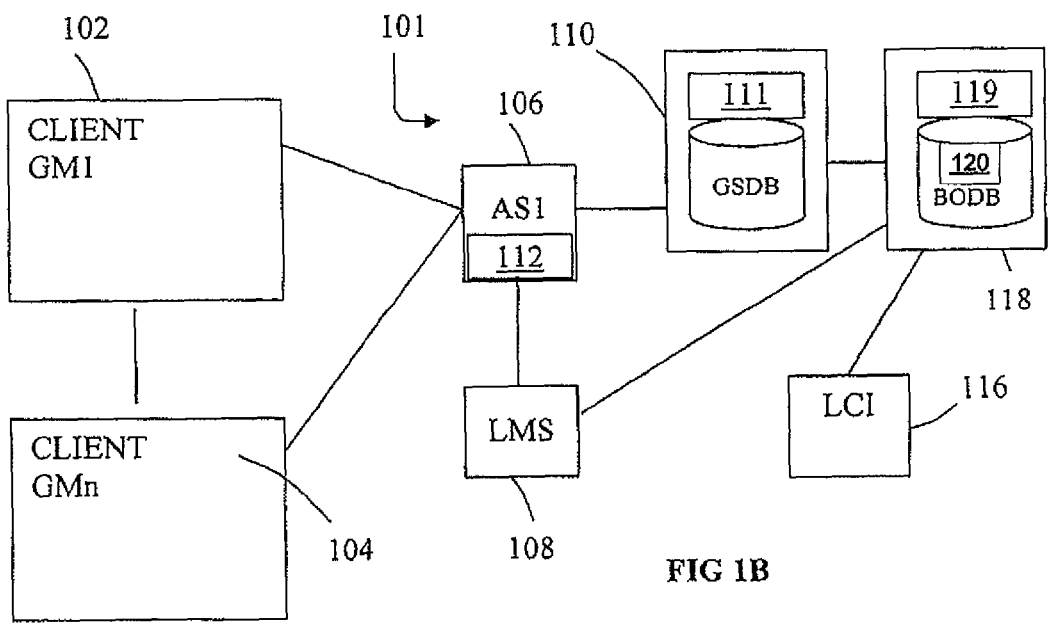
FIG. 1B shows schematically an embodiment of a client-server based gaming system with a plurality of gaming machines and a license management system in accordance with an embodiment of the invention.

FIG. 1B shows schematically an exemplifying embodiment of a client/server based gaming system 101 with a license management system in accordance with certain embodiments of the invention. A plurality of gaming machines, here illustrated with a first client gaming machine GM1 102 and a second gaming machine GMn 104, where n is an arbitrary number as exemplified above, are communicatively coupled to a game application server AS 106 via a communications network 104. The game application server is in turn communicatively coupled to a game server database 110 has a database application logic layer 111 and a database storage structure GSDB. The game server database 110 is further communicatively coupled to a back office database 118, similarly having a database application logic layer 119 and a database storage structure BODB. The game application server AS 106 is further provided with a license management client module 112 devised for communication with a license management server 108. The license management server 108 and a license configuration interface 116 are in this embodiment communicatively coupled with a license parameter database 120 that preferably is realised in the back office database 118. "Communicatively coupled" in this text means that there is provided a communication link over which information signals can be communicated between two coupled units, for example in the form data packets or the like. The communication link can for example be continuously activated in an on-line state or be activated on request when a message, e.g. in the shape of a request or a response, is communicated.

Figure 3:
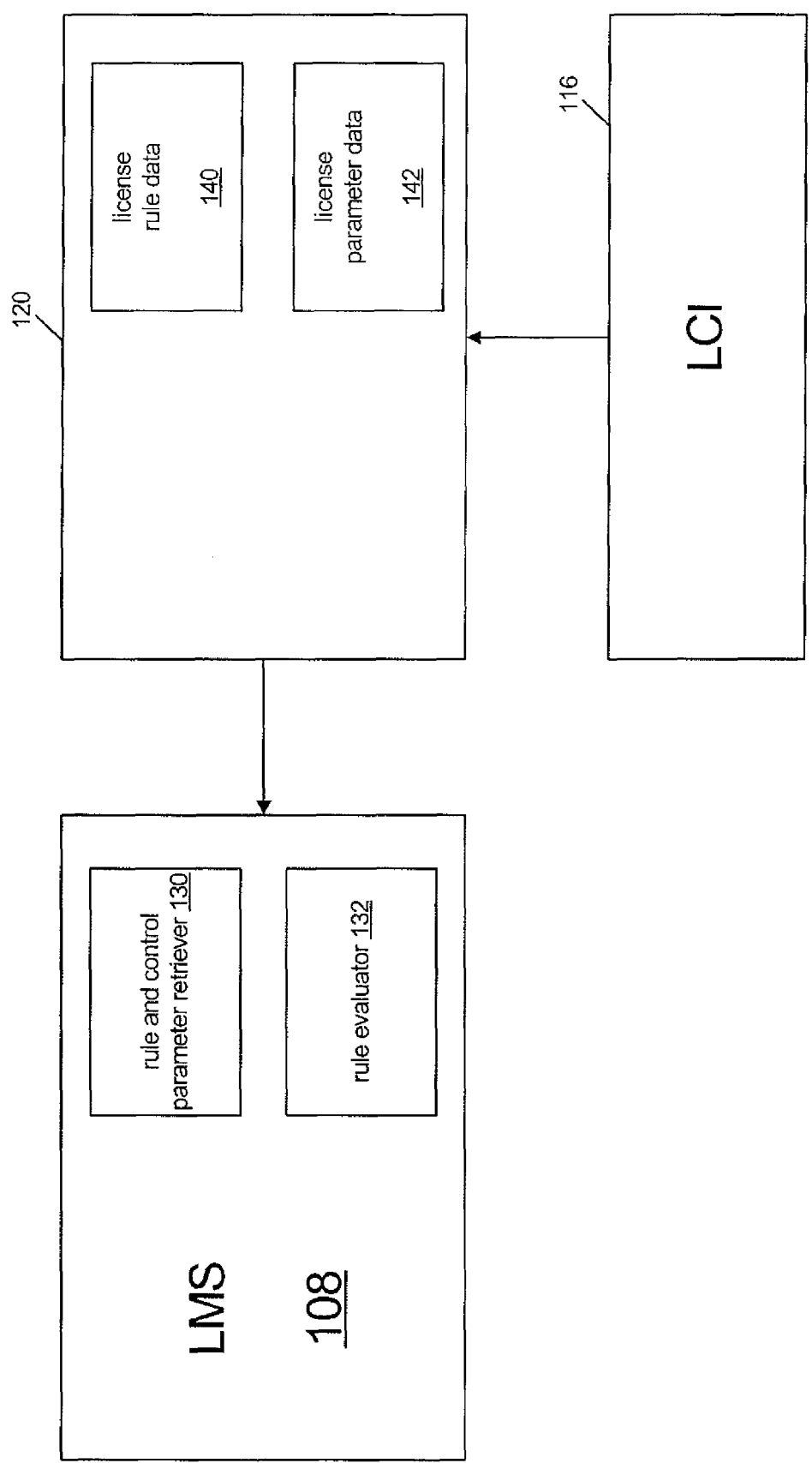
FIG. 3 is a block diagram showing detail of the license management server.

Referring to FIG. 3 it will be seen that the licensing management server 108 includes a rule and control parameter retriever 130 adapted to retrieve rule data 140 and parameter data 142 from the license parameter database 120. A rule evaluator 132 thereafter processes the rules and the license parameter data 142 in order to generate one or more license control parameters (or a single license control parameter that encodes one or more factors). The licensing control interface 116 allows a user to specify the license rules and license parameters.

The gaming system according to the present embodiment of is based on a client/server architecture where the game software is divided into a client game module and a server game module with access to a central database. In order to run a game the client game module must be associated with and use functions available at a server game module. When a game is played via a client gaming machine, a game session is established and game session data is generated in the course of the game. Each game session has a specific identity and is assigned a game session identify code. The game session data is stored in the game server database associated with the game session identity code.

Figure 2:
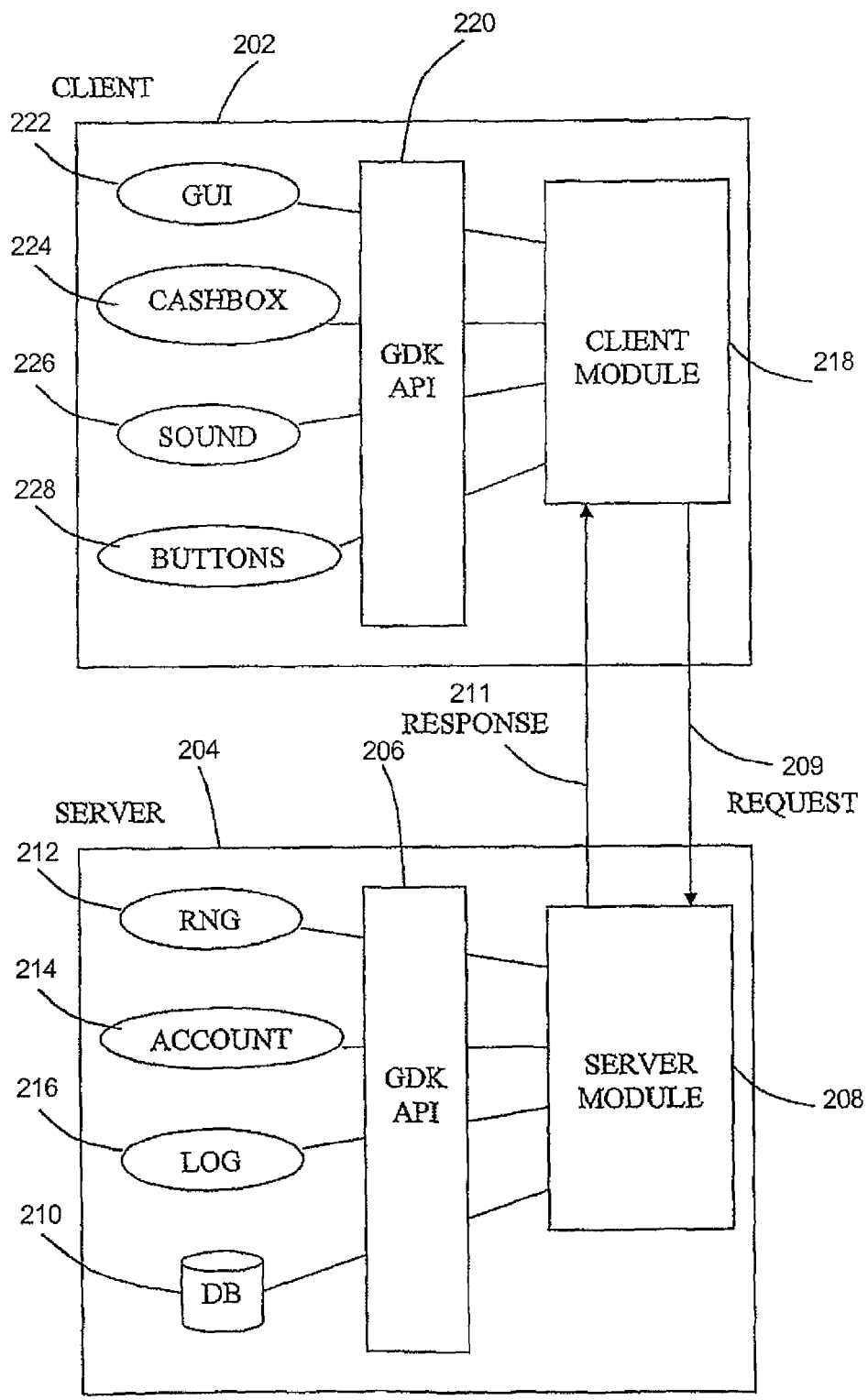
FIG. 2 shows a block diagram of further components of a gaming system.

FIG. 2 shows schematically a client and server based computerised gaming system with a client gaming machine terminal 202 and a gaming server 204 that are communicatively coupled. The gaming machine 202 and the gaming server 204 are provided with data processors, memory, data communications interfaces, control programs, user input/output interfaces etc. in a per se well known manner. Different functions and features that are specific for the preferred embodiment are preferably realised by software computer program code executed by data processors in the server and in the client respectively, or by employing specifically designed electronic components, or by means of combinations of software and electronic components. In the example of FIG. 2 there is only a single client gaming machine 202 but of course a number of client gaming machines can be and are normally connected to a server 204. In this context a server 204 generally means hardware and software units in a central system that provide server functions, database functions and other centralized functions to connectable client gaming machines.

The server 204 is provided with a game application program interface, in short called server game API 206, enabling communication between a server module of a specific game application program 208 and general server gaming functions 210,212,214,216 installed on the server. The general server gaming functions are provided to be available for any specific game application program independently of the specific game content. These general server gaming functions are typically functions such as a database 210, a random number generator 212, an account service function 214, a log service function 216, or other functions that can be beneficially shared and used by different specific game application programs.

The client gaming machine 202 is also provided with a game application program interface, in short called client game API 220, enabling communication between a client game module 218 of the specific game application program and general client gaming functions 222,224,226,228 installed on the client gaming machine 202 and used by different client game modules. The general client gaming functions are designed for assisting in implementing and executing a specific game on the client gaming machine 202 and are available for the client game module 218. These general client gaming functions are in different embodiments a selection of a graphical user interface (GUI) 222, a cashbox function 224, a sound function 226, user input interface function, for example buttons, 228, data storage 229, a printer 203, a bar code reader 233 and other functions that are related to the performance of a game. The client game module 218 is communicatively coupled to the corresponding server game module 208 for communicating requests 209 and responses 211 in order to utilize the general gaming functions provided in the server. For each game a message protocol for communication between the client module and the server module is generated, the protocol is for example based on XML and is shared by the client and the server.

A specific game application program thus comprises a server game module 208 and a client game module 218 that communicate either directly or via an application program interface on the client side and the server side respectively as shown in FIG. 2. The client game module 218 uses a selection of general client gaming functions that are available in the client gaming machine, whereas the server module 208 uses a selection of general server gaming functions 210,212,214,216 that are commonly used by different game applications and that are provided and available centrally in the server 204. Further details of a server gaming architecture can be found in WO 2006/052213 and PCT/SE2006/000559, the disclosures of which are incorporated herein by reference.

Establishment of the gaming session involves the gaming server loading the relevant server module, and providing (if necessary) the relevant client module to the client gaming machine.

This client/server architecture entails that all active gaming machines and active game sessions are known at server side all the time. This in turn enables a wide variety of license configuration rules and parameters.

It will be apparent to persons skilled in the art that in an embodiment where a server-based architecture is employed, the licensing client can reside at the gaming terminal or at the gaming server.

Figure 5:
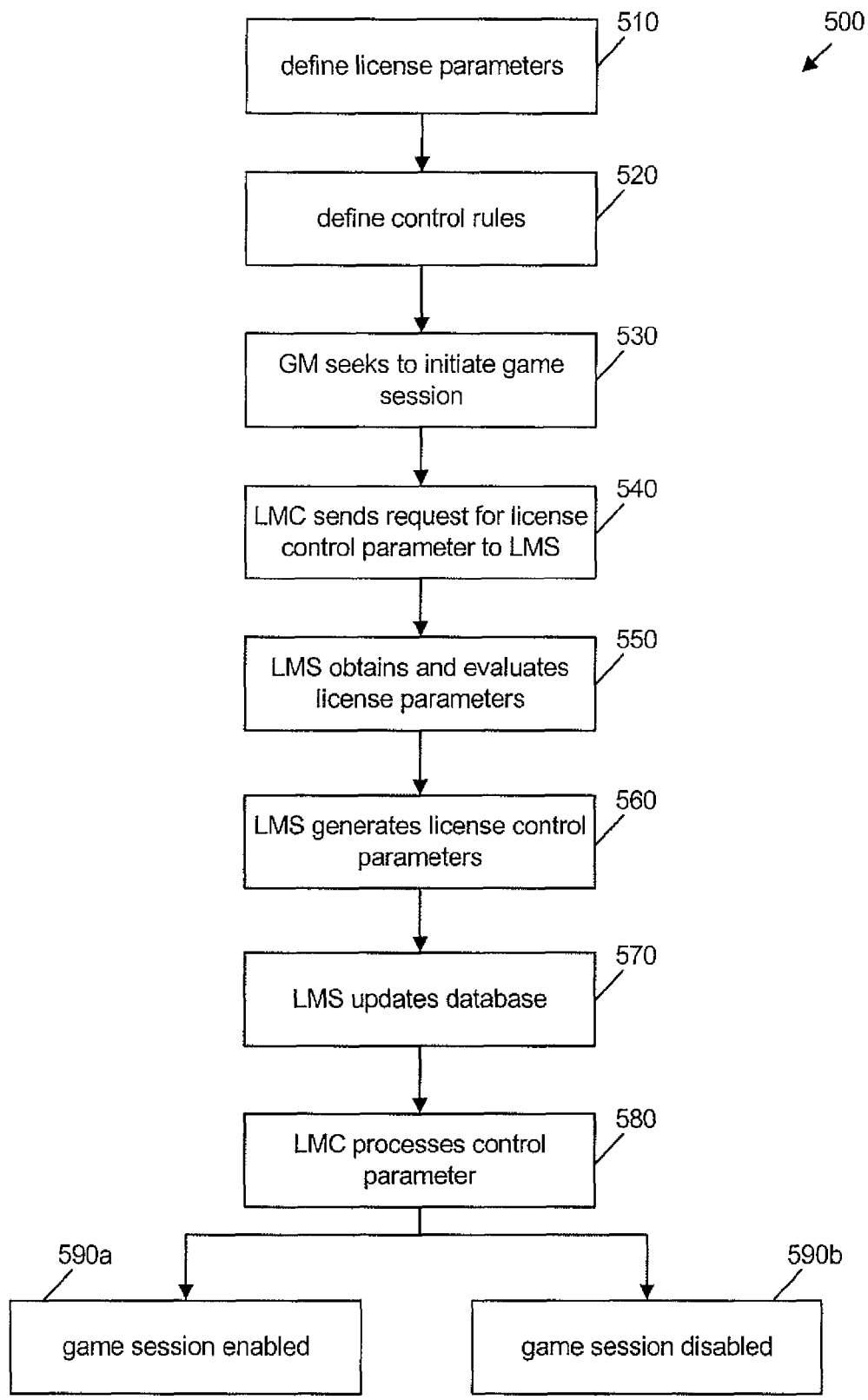
FIG. 5 is a flowchart of a preferred embodiment.

The process 500 for license management according to certain embodiments of the invention comprises in an exemplifying embodiment of FIG. 5 in a client/server based gaming system where the client resides on the server side, a selection of the following steps is required for a specific application. In an embodiment with license management clients provided in the gaming machines, the steps are adjusted accordingly.

1. Predetermined license parameters are defined and stored in the license parameter database 510.
2. Predetermined license dependent control rules are defined and stored in the license parameter database 520.
3. A client gaming machine sends a request to the game application server to initiate a gaming session 530.
4. A license management client in the game application server sends a request to a license management server for a license control parameter 540.
5. The license management server evaluates the license parameters and/or license control rules related to the request and on current license utilization statistics comprised in the license parameters. As described it is possible that the request for a gaming session is not the subject of any license restraints, which is also deducible from the license parameters 550.
6. The license management server generates a license control parameter based on the predetermined license parameters and/or on the predetermined license control rules retrieved from the license parameter database, and returns said license dependent gaming machine control parameter in a response message 560.
7. If applicable a license parameter is updated in the database based on the resulting license control parameter 570.
8. The license management client of the game application server processes 580 the control parameter and determines what action, if any, is required. In a straightforward embodiment, the license management client enables 590A or disables 590B the continued establishment of the gaming session of said client gaming by means of an enabling or disabling response to the requested service, dependent on said license control parameter. In other embodiments, the gaming machine may restrict the player options available in the game session—eg. prevent access to high-stake betting.

A variety of categories of license parameters are conceivable within the inventive concept. For example:

1. A predetermined maximum number of gaming machines that are logged in as active.
2. A predetermined maximum number of started and/or active games.
3. A predetermined maximum number of specific games.
4. A predetermined maximum number of games of specific types. For example games having a bet limit above a certain amount eg. "high-bet" games, games marked as "new" or "premium" etc.
5. A predetermined maximum amount of money that can be paid into the gaming system for playing games during a specific time period.
6. A predetermined maximum amount of money that can be paid out from the gaming system as prizes during a specific time period.
7. A predetermined maximum number of gaming clients or game servers that are enabled to be installed on the gaming system.

A variety of license constructions can be realised and controlled by means of the inventive concept. For example:

1. A license granted for each installed gaming machine.
2. A license granted for a predetermined number of active gaming machines and a floating license that is complied with by means of a predetermined algorithm or rules.

The duration or lifespan of the enabling license dependent gaming machine control parameter can vary. For example the enabling control parameter can be valid:

1. Until the gaming machine is logged out from the gaming system.
2. For a predetermined amount of time. The timing can for example be realised by means of the game application server or by means of a parameter coupled to the relevant gaming unit and stored in the game server database.
3. Dependent on the credit balance for a current player. For example, the enabling control parameter can be valid until a credit has been consumed and a new license parameter request is processed when more credit is entered for the game or for the gaming machine.

In accordance with certain embodiments of the invention there are various parameters for defining a gaming machine or a game as active. For example, by registering when the gaming machine is logged into the system, or by requiring a predetermined transaction frequency or a predetermined maximum amount of time between transactions.

Certain embodiments of the invention thus have the technical effect that an operator of a gaming system can have an install base of gaming machines or game software modules that is larger than the number of active and operational units that current licenses permit.

It will thus be appreciated that runtime control is achieved by determining a license control parameter dependent, for example, on a license parameter and/or a license control rule in response to initiating a gaming session.

Further, the operator who, for example, operates plural venues can ensure that operatively enabled gaming machines are active where the players are at the moment.

Further more flexible license schemes are enabled, such as with a license fee that is divided into an install part and a usage part, where the usage part is a floating license with a fee that is charged only for active usage.

The invention has been described by way of exemplifying embodiments, but naturally there are various manners of realising embodiments of the invention within the scope of the claims.

EXAMPLE

Figure 4A:
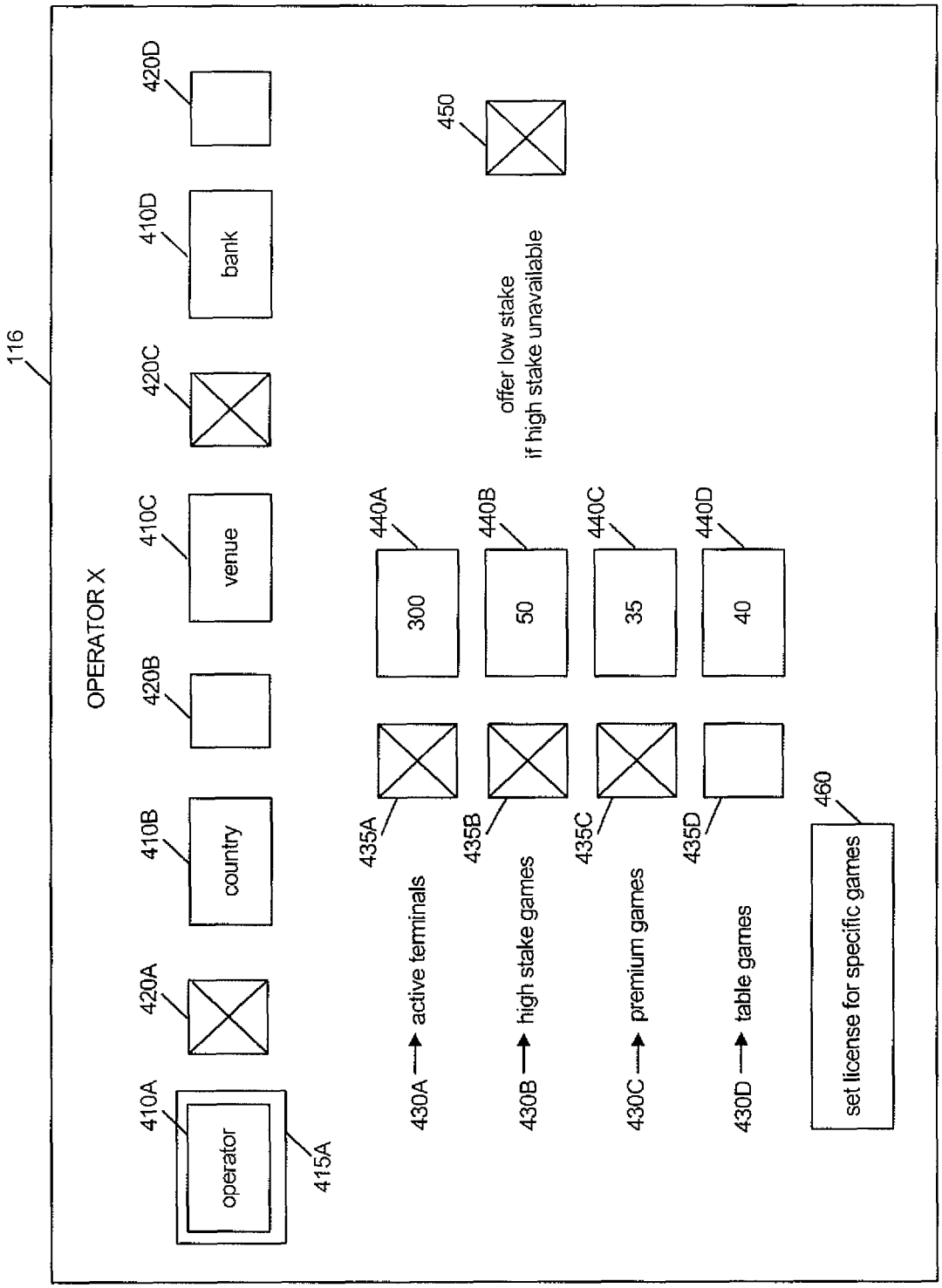
FIGS. 4A and 4B are exemplary user interfaces.
Figure 4B:
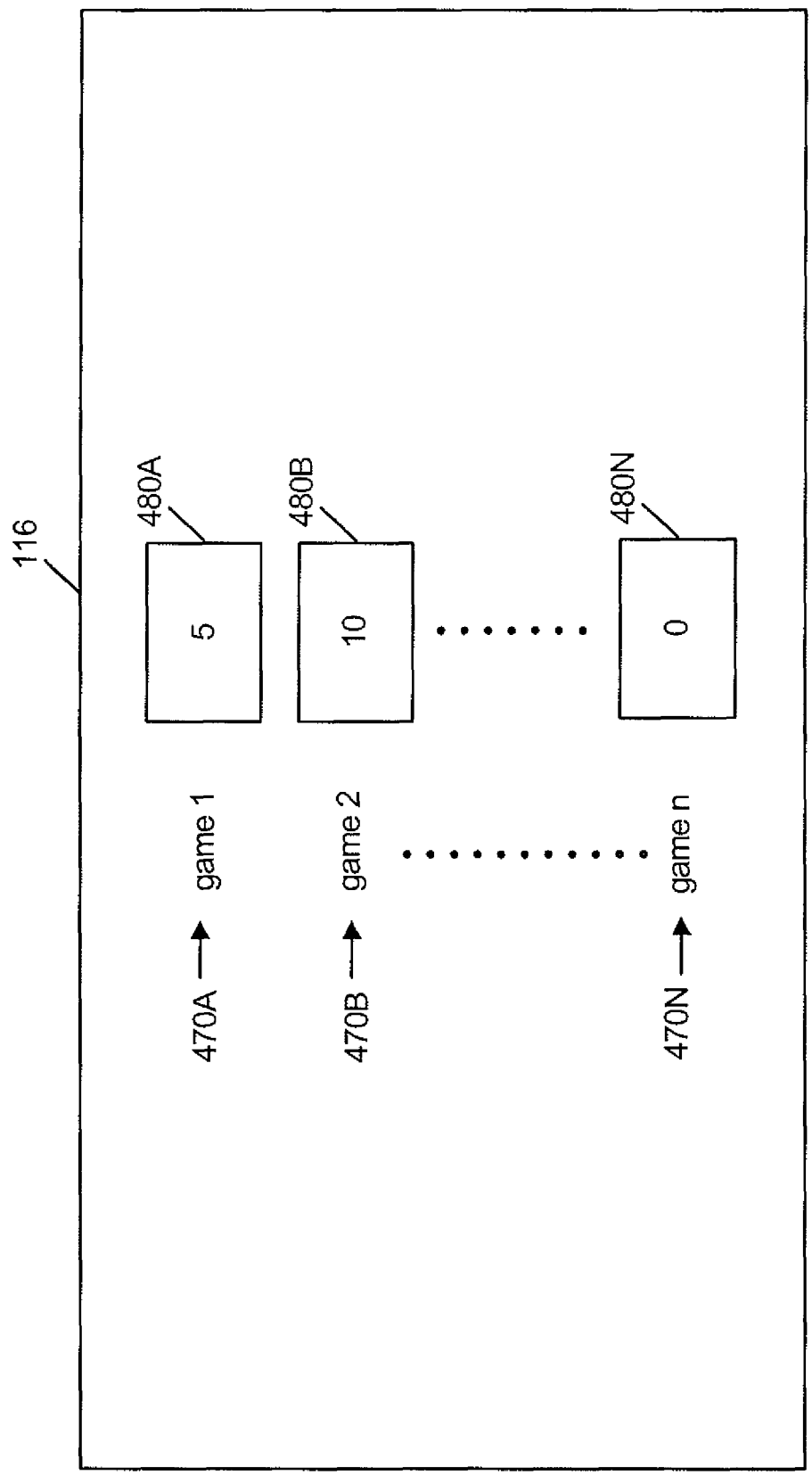

FIGS. 4a and 4b shows an exemplary display of a licensing control interface 116. FIG. 4a shows the interface shows the interface being used to set control rules and control parameters for "Operator X". FIG. 4a shows that in this example rules can be set at 4 levels, operator level 410a, country level 410b, venue level 410c, and bank level which levels to banks of machines within a venue 410. Check boxes 420,420a, 420b,420c, 420d are marked in order to indicate whether rules have been set at any of these levels. In this example, check boxes 420a, 420c are marked to indicate that rules are set at the operator and venue level. The operator button 410a is highlighted 415A to indicate that the user is currently processing rules at the operator level.

There are a series of rules 430 relating to the number of active terminals 430a, high stake games 430b, premium games 430c, and table games 430d that can be activated at the operator level. Check boxes 435a,435b,435c,435d are marked to indicate which rules are active. In this case rules are active in respect of active terminals 430a, high stake games 430b and premium games 430c. The rule currently set in respect of table games 430d is inactive. Accordingly, if the licensing management server receives a request for a table game it will automatically fulfil this request or return an enable control parameter. Boxes 440 allow a user to specify a value of a control parameter. Accordingly 300 active terminals are specified by box 440a, 50 high stake games are specified by box 440b and 35 premium games are specified by box 440c. It will be apparent to a person skilled in the art that in this embodiment provision of a gaming parameter will need to satisfy each of these rules therefore a request for a gaming session needs to be evaluated relative to these rules. Accordingly the license management client transmits to the licensing management server data from which satisfaction or non satisfaction of these rules can be determined. A person skilled in the art will appreciate that additional information can be displayed on the interface 116, for example in respect of each category a current license count. Check box 450 allows a user to specify a different type of rule. In this case the rule is that the license control parameter will, if a high stake game is unavailable, allowing the license management client to offer a low stake equivalent of the same game to the player. In a similar manner if a specific game is unavailable, the license control parameter may allow the license management client to offer alternative games. Accordingly it will be appreciated that the license control parameter returned by the licensing management server need not always enable or disable the gaming session. That is, an enablement may be subject to a modification to the establishment of the game session. In this embodiment, the licensing management client is configured to offer to the user an alternative and if this is accepted it reverts to the licensing management server to confirm that the alternative has been accepted and to update the licensing parameters accordingly. The offer may be open for a limited period of time in order to prevent a collision with an alternative request which might breach a license condition.

FIG. 4a shows that in this example a player has the option to set licenses for a specific game. Selecting button 460 takes the player to a further screen 116 shown in FIG. 4b where a series of games 470a to 470n are displayed to a player and the player can set control parameters for each of the games in boxes 480a to 480n.

A person skilled in the art will appreciate that the licensing interface 116 can be operated in a number of different ways. For example it may include a function to allow a player to group games and apply a total for that group. This allows a provider to group games and apply a limit across those games.

A person skilled in the art will appreciate that the above technique provides great flexibility and allows licenses to be applied in respect of a number of factors that can be independent of one another. For example the total number of active terminals is independent of the number of premium games.

In the claims which follow and in the preceding description of certain embodiments of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system comprising:
   a gaming machine terminal configured to request an initiation of a game by sending an initiation request for a respective game session; a license management client (LMC) configured to communicate said initiation request and to control the initiation of the game session based on one or more license control parameters (LCPs), and a license management server (LMS) in data communication with the LMC and configured to, responsive to receiving from the LMC data informative of the initiation request, generate a plurality of LCPs and to serve the generated plurality of LCPs to the LMC, wherein the plurality of LCPs is generated in accordance with a set of license control rules and comprises at least one first LCP configured to enable the requested game session and at least one second LCP configured to restrict one or more player's options when the game is enabled, and wherein the restricted player's option is an access during an enabled game, to betting stakes higher than a predefined value.

2. The gaming system of claim 1, wherein the rules in the set of license control rules being individually settable at multiple levels including:
   at a country level wherein all gaming machine terminals in a country are affected;
   at a venue level wherein only gaming machine terminals within a venue affected;
   at operator level wherein only gaming terminals under the same operator are affected, and
   at a bank level wherein only gaming machine terminals within a bank in a venue are affected.

3. The gaming system of claim 1, wherein the generated plurality of LCPs further comprises at least one LCP generated in accordance with a predetermined maximum amount of money that can be paid into the gaming system for playing games during a specific time period.

4. The gaming system of claim 1, wherein the generated plurality of LCPs further comprises at least one LCP generated in accordance with a predetermined maximum amount of money that can be paid out from the gaming system as prizes during a specific time period.

5. The gaming system of claim 1, wherein the generated plurality of LCPs further comprises at least one third LCP configured to control a lifespan of the at least one first LCP configured to enable the requested game session.

6. The gaming system of claim 5, wherein the at least one third LCP is configured to terminate the at least one first LCP when the gaming machine is logged out from the gaming system.

7. The gaming system of claim 5, wherein the at least one third LCP is configured to terminate the at least one first LCP depending on a credit balance for a current player.

8. The gaming system of claim 1, wherein the license management client is provided in a game server.

9. The gaming system of claim 1, wherein the license management client is provided in the gaming machine terminal.

10. The gaming system of claim 1, wherein the at least one first LCP encodes plural license conditions.

11. A method of license management in a computerized gaming system having at least one gaming terminal and a license management server, said license management server storing a set of license control rules, the method comprising:
    responsive to receiving by the license management server (LMS) data informative of an initiation request sent by a gaming machine terminal for initiating of a game session, generating, in accordance with the set of license control rules, a plurality of LCPs; and
    controlling, by the LMS, initiation of the game session based on the generated plurality of LCPs,
    wherein the generated plurality of LCPs comprises at least one first LCP configured to enable the requested game session and at least one second LCP configured to restrict one or more player's options when a game corresponding to the initiation request is enabled, and wherein the restricted player's option is an access, during an enabled game to betting stakes higher than a predefined value.

12. The method of claim 11, further comprising individually setting the rules in the set of license control rules at multiple levels including:
    at a country level wherein all gaming machine terminals in a country are affected;
    at a venue level wherein only gaming machine terminals within a venue are affected;
    at operator level wherein only gaming terminals under the same operator are affected, and
    at a bank level wherein only gaming machine terminals within a bank in a venue are affected.

13. The method of claim 11, wherein the generated plurality of LCPs further comprises at least one LCP generated in accordance with a predetermined maximum amount of money that can be paid into the gaming system for playing games during a specific time period.

14. The method of claim 11, wherein the generated plurality of LCPs further comprises at least one LCP generated in accordance with a predetermined maximum amount of money that can be paid out from the gaming system as prizes during a specific time period.

15. The method of claim 11, wherein the generated plurality of LCPs further comprises at least one third LCP configured to control a lifespan of the at least one first LCP configured to enable the requested game session.

16. The method of claim 15, wherein the at least one third LCP is configured to terminate the at least one first LCP when the gaming machine is logged out from the gaming system.

17. The method of claim 15, wherein the at least one third LCP is configured to terminate the at least one first LCP depending on a credit balance for current player.

18. The method of claim 11, wherein the at least one first LCP encodes plural license conditions.

* * * * *